TRANSISTOR FULL ADDER

Filed Sept. 4, 1956 2 Sheets-Sheet 1

*INVENTOR*
GENUNG L. CLAPPER
BY
Dewey J. Cunningham
ATTORNEY

May 5, 1959 G. L. CLAPPER 2,885,149

TRANSISTOR FULL ADDER

Filed Sept. 4, 1956 2 Sheets-Sheet 2

| A | B | C | I (Ma) | E | S | C |
|---|---|---|---|---|---|---|
| Ø | Ø | Ø | — | -14 | Ø | Ø |
| 1 | Ø | Ø | 4 | -9.5 | 1 | Ø |
| Ø | 1 | Ø | 4 | -9.5 | 1 | Ø |
| Ø | Ø | 1 | 4 | -9.5 | 1 | Ø |
| 1 | 1 | Ø | 8 | -5 | Ø | 1 |
| Ø | 1 | 1 | 8 | -5 | Ø | 1 |
| 1 | Ø | 1 | 8 | -5 | Ø | 1 |
| 1 | 1 | 1 | 12 | -.5 | 1 | 1 |

2,885,149

TRANSISTOR FULL ADDER

Genung L. Clapper, Vestal, N.Y., assignor to International Business Machines Corporation, New York, N.Y., a corporation of New York Application September 4, 1956, Serial No. 607,662

3 Claims. (Cl. 235—172)

This invention relates to an improved signal translating apparatus, and particularly to an improved arrangement for performing high speed addition of two numbers.

An adder is the heart of the digital computer. It is used in almost all arithmetic operations. In general, the prime function of an adder is to receive an Addend digit, an Augend digit and a Previous-Carry and produce therefrom Sum and Carry outputs. The equations for a full adder capable of performing the above operation may be defined in Boolean Algebra terminology as follows:

$$S=A\bar{B}\bar{C}'+\bar{A}B\bar{C}'+\bar{A}\bar{B}C'+ABC'$$

$$C=AB\bar{C}'+A\bar{B}C'+\bar{A}BC'+ABC'$$

Where $A$=Augend
$B$=Addend
$C'$=Previous-Carry
$S$=Sum
$C$=Carry

The Boolean Algebra convention used in these equations is that a plus sign represents an Or condition while the lack of this sign between two letters, as commonly used in multiplication operations, represents an And condition. The use of a bar over a letter indicates a Not condition, i.e., a binary "0," while the absence of a bar over a letter indicates a binary "1." These equations for a full adder are derived from truth tables which are formed by taking all possible combinations of A, B and C', and determining whether a Sum or a Carry output is produced from each possible combination.

In order ot implement a full adder, each of these equations must be satisfied. By using Boolean Algebra techniques of simplification, it is possible to arrive at a somewhat simpler statement of the Sum and Carry equations. Once these simplified equations are arrived at, it is then a matter of arranging a plurality of switching circuits, i.e., And, Or and Not circuits, in a manner to perform the logical operation called for by the equation. This is perhaps the most used approach to addition at the present time in digital computers.

There is another method utilized to obtain the sum of two binary numbers. This method involves the application of Kirchhoff's Law. In a circuit utilizing Kirchhoff's Law, the algebraic addition of voltage values may be obtained by providing a plurality of electron discharge device amplifiers arranged to have a common load impedance, the voltage developed across this impedance being proportional to the number of input voltages existing simultaneously on the input terminals to the amplifiers. Accordingly, the output voltage developed at the common plate or anode load of the amplifiers is a step voltage, the magnitude of which is a function of the number of input signals existing at any one time. A suitable circuit utilizing electron discharge devices is used to produce Sum and Carry output signals from the step voltage. One of the disadvantages possessed by this circuit, as it is known in the art today, is a tendency to unreliability. In addition, there is the requirement that a considerable swing in potential is necessary between the successive steps of the step voltage, this large change being necessary in order to sense the change in the steps.

Where the digital computer in which the adder is to be used utilizes transistors rather than vacuum tubes, there are a number of requirements which must be met in order to operate at high speeds reliably. Some of these requirements or restrictions are (1) there shall be a minimum of phase shift or time delay from input to output, (2) the outputs shall be capable of driving several other devices including line capacitance, (3) the inputs shall not present D.C. current loading to any driver greater than one milliamp, and (4) the input and output waveforms shall be to some standard low amplitude signal.

These restrictions are dictated by the current handling capability of presently available transistors, this capability being a function of the allowable power dissipation characteristics out of the transistor. The standard approach to the problem of a full adder using Boolean Algebra reveals that there are a number of switching circuits which use less than twenty diodes. One of the simplest may use as few as sixteen diodes. However, with the restrictive conditions recited above it has been found that as many as thirteen transistors are required in addition to the diodes. In addition to those logical diodes used for switching purposes, at least two diodes are required for limiting in the transistor circuits so that it turns out that as many as eighteen diodes and thirteen transistors are required to build an adder that is capable of accomplishing the desired result.

The total phase shift of the Boolean type adder with eighteen diodes and thirteen transistors would be from .7 to 1.2 microseconds. For speeds of operation which are desired for computers of the future such a time delay is too great. The present invention was designed to overcome the problems noted above and in addition utilizes far fewer transistors and diodes and yet has the capability of meeting all of the restrictive conditions outlined.

In the present invention a step voltage is generated by using a plurality of constant current generators, there being a constant current generator for each of the inputs to the adder. A transistor is utilized as the constant current generator in the present invention and affords the production of a step voltage wherein each step is of the same increment. This step voltage is fed to each of three transistors, each being biased to be responsive to a particular one of the steps. A first transistor is responsive to the first step and is capable of producing a sum signal, it being allowed to produce this signal by virtue of the fact that the transistor which is responsive to the second step controls a fourth transistor in circuit with said first transistor and allows the first transistor to conduct. When the second step of the step voltage occurs, the second transistor becomes effective to produce a carry output and also disables the first transistor by disabling said fourth transistor, thereby preventing the first transistor from producing a sum signal. When the third step occurs, the third transistor is allowed to produce a sum signal directly, this third transistor being unaffected by the fact that the first transistor is disabled. Thus Sum and Carry output signals are produced as a function of the number of input signals received.

In view of the above, a primary object of the present invention is to produce an improved signal translating apparatus.

Another object of this invention is to provide an improved apparatus for summing information in binary form and producing Sum and Carry output signals.

Another object of the invention is to furnish a full adder which is capable of operation in either serial or parallel fashion.

Another object of this invention is to provide an improved arrangement for converting binary input pulses or voltages into a step voltage, and thereafter producing Sum and Carry output pulses or voltages indicative of the binary addition of the input pulses or voltages.

Another object of this invention is to furnish an improved arrangement for translating a step voltage into discrete voltages indicative of the Sum and Carry functions of binary addition.

A further object of this invention is to provide an improved signal translating apparatus for performing binary addition reliably at very high speeds.

A still further object of this invention is to provide an improved full adder which utilizes transistors as the logical elements and which affords a complete addition operation with a minimum of parts and is thereby economical to produce.

Another object of this invention is to provide a full adder in which there is a minimum of phase shift or time delay between input and output, the outputs being capable of driving a number of devices without excessive deterioration of the output signals.

Another object of the invention is to provide an improved full adder utilizing transistors in which the D.C. current loading on the output drivers supplying the Sum and Carry signals is very low, i.e., in the order of one milliampere.

Other objects of the invention will be pointed out in the following description and claims and illustrated in the accompanying drawings, which disclose, by way of examples, the principle of the invention and the best mode, which has been contemplated, of applying that principle.

Figures 2, 3:
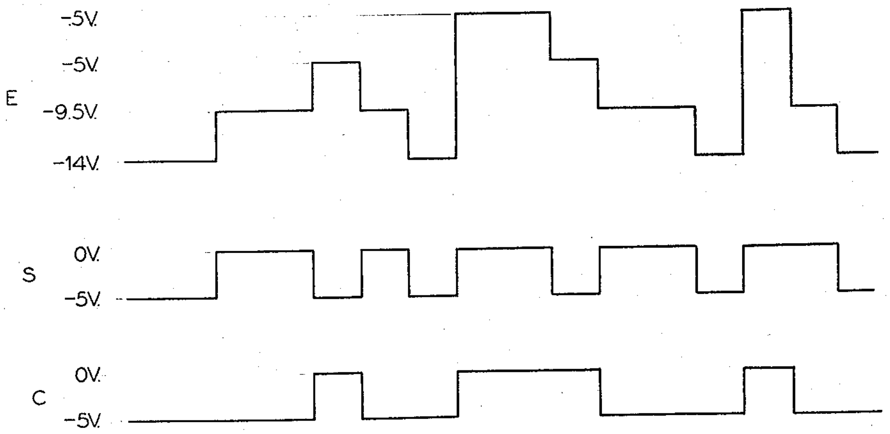
Fig. 2 shows a truth table and has associated therewith various voltage values and current values which are present at particular points in the circuit of Fig. 1.
Fig. 3 shows a plurality of waveforms which are produced under various conditions in the circuit of Fig. 1.

Referring now to Fig. 2 in the drawings, there is illustrated a chart which includes a truth table. Under the headings A, B and C′, all of the combinations of inputs possible for use by a full adder are shown. Under the headings S and C, there is an indication of the Sum and Carry conditions, respectively. For example, if each of A, B and C′ have a binary value of "0," the sum will be "0" and the carry will be "0." Should the binary value of A be "1" and the binary values of B and C′ each be "0," then the Sum will be "1" and the Carry will be "0." As noted thereafter, as long as one and only one of the inputs has a binary value of "1," there will be produced a Sum signal but not a Carry signal. On the other hand, where two of the inputs have a binary value of "1," the Sum will be "0" and the Carry will be "1." If all of the inputs have a binary value of "1," the Sum as well as the Carry, will have a binary value of "1." It will be seen that the equations recited above will follow the truth table.

Figure 1:
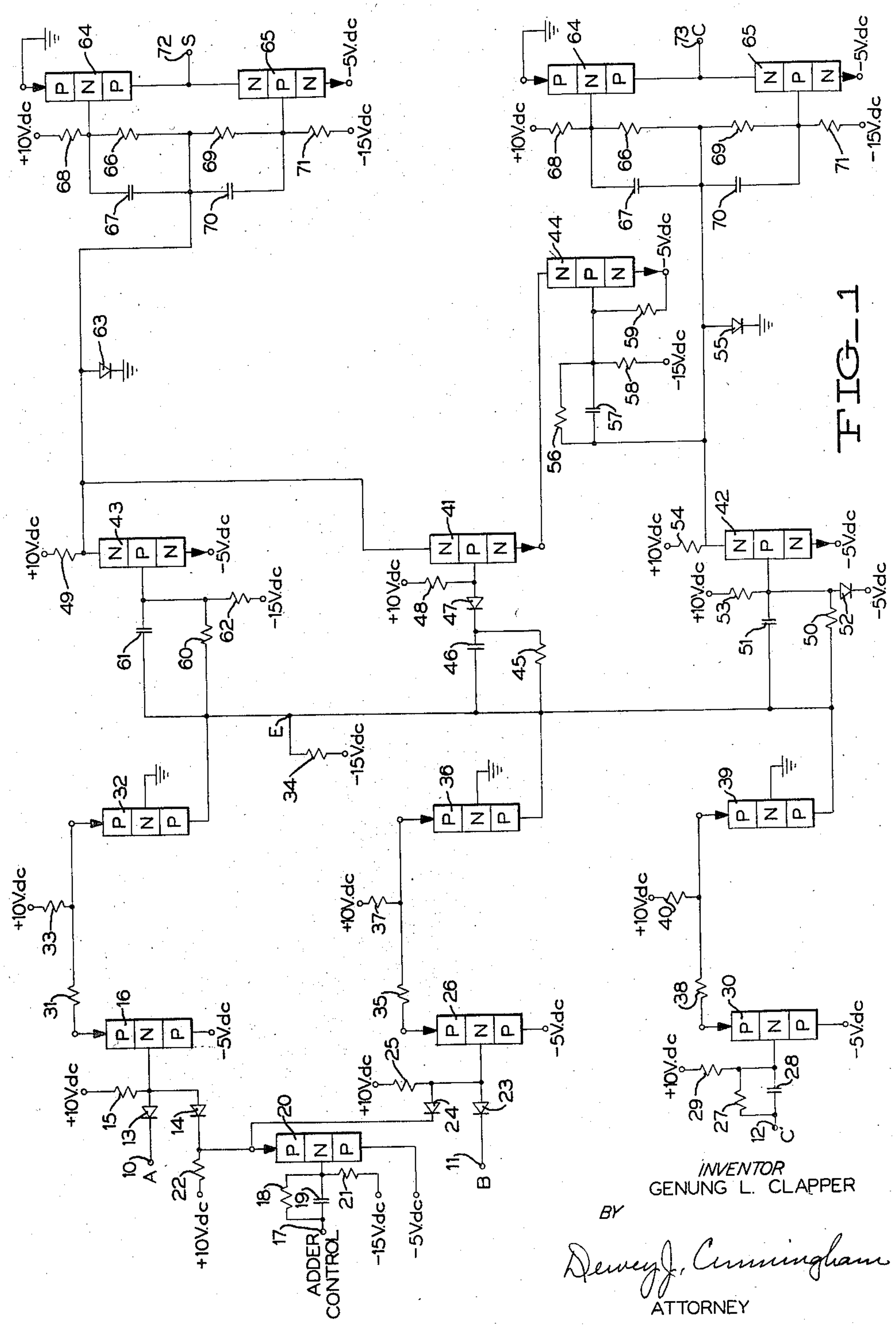
Fig. 1 is a schematic diagram of the full adder forming the present invention.

Referring now to Fig. 1, there will be described the detailed circuit which produces Sum and Carry outputs in response to input signals representing A, B and C′. As shown in Fig. 1, the input signals A, B and C′ are respectively supplied to terminals 10, 11 and 12. In the present invention, there is disclosed as arrangement for controlling the application of the input signals on the terminals 10 and 11 to the remainder of the circuit. This is accomplished by providing a first switch which comprises diodes 13 and 14 and a resistor 15. The output of this switch, which is taken from the commoned plates of the diodes, is connected to the base of a PNP junction type transistor 16 which is connected in the grounded collector configuration and serves as an emitter follower.

The convention used in the drawing to indicate the various electrodes of the PNP and NPN junction type transistors is that the emitter is always shown as an arrow at the top of a PNP transistor and at the bottom of an NPN transistor. The arrow points toward the upper P-type region of the PNP transistor and away from the lower N-type region of the NPN transistor. The collector electrode is connected to the lower P-type region of the PNP transistor and to the upper N-type region of the NPN transistor. The base electrode is connected to the center N-type region of the PNP transistor and to the center P-type region of the NPN transistor. It is conventional terminology to describe transistors as being connected in a grounded base, a grounded emitter or a grounded collector configuration. It will be understood, however, that the particular electrode included in the term is not necessarily connected to ground potential. It is merely indicative of the fact that a particular terminal is connected to some fixed reference potential. Thus, for example, a transistor connected in a grounded base configuration may have the base electrode thereof connected to ground potential, a negative potential or a positive potential.

The input to diode 14 is derived from the Adder Control signal which is applied to terminal 17. This signal is supplied through a parallel RC network comprising resistor 18 and capacitor 19 to the base of a PNP transistor 20, said base being connected by way of a resistor 21 to a negative source of D.C. potential. The transistor 20 is also connected in a grounded collector configuration and serves as an emitter follower, the emitter being connected through a resistor 22 to a positive source of D.C. potential. Thus if there is the presence of an adder control signal in the form of a positive potential, transistor 20 will be placed out of conduction and cause a relatively positive potential to be supplied from the emitter thereof to the cathode of diode 14. If this relatively positive potential occurs in coincidence with an input at terminal 10, a relatively positive voltage will be supplied to the base of transistor 16, thereby turning this transistor off.

The other input switch comprises diodes 23 and 24 and a resistor 25. The input signal labeled B, which is applied to terminal 11, is received by the cathode of diode 23, the plate thereof being connected to the plate of diode 24, the cathode of the last-mentioned diode being connected to the emitter of transistor 20. Resistor 25 is connected to the commoned plates of diodes 23 and 24 and to a positive source of D.C. potential. The output from the switch is supplied to the base of a PNP junction type transistor 26 which is connected in a grounded collector configuration that serves as an emitter follower. The Previous-Carry input signal C′, which is applied to terminal 12, is connected through the parallel RC network comprising resistor 27 and capacitor 28 to the base of a PNP junction type transistor which is connected in a grounded collector configuration and serves as an emitter follower. The base of the transistor is connected through a resistor 29 to a positive source of D.C. potential. It is seen that the Previous-Carry input signal C′ is not controlled by the adder control signal. This allows the Previous-Carry signal to be supplied back to the terminal 12 and to be processed on through the adder even though the adder control signal cuts off the receipt of signals A and B.

It will be seen that relatively positive inputs to each of terminals 10, 11 and 12 will result in transistor 16, 26 and 30 being turned off, providing a relatively positive Adder Control signal is supplied to terminal 17. The emitter of transistor 16 is connected by way of a voltage divider comprising resistors 31 and 33 to a positive source of D.C. potential, a point intermediate the last-mentioned resistors being connected to the emitter of a PNP junction type transistor 32 which serves as the current generator for the A input signal. The emitter of transistor 26 is connected by way of a voltage divider comprising resistors 35 and 37 to a positive source of D.C. potential. A tap is made between the last-mentioned resistors and connected to the emitter of a PNP junction type transistor 36 which serves as a constant current generator for the B input. The emitter of transistor 30 is connected by way of a voltage divider comprising resistors 38 and 40 to a positive source of D.C. potential, there being a tap provided intermediate said resistors for connection to the emitter of a PNP junction type transistor 39 which serves as the constant current generator for the C′ input.

Each of the transistors 32, 36, and 39 are connected in a grounded base configuration and have their collectors all tied together and connected by way of a resistor 34 to a negative source of D.C. potential. It is on this common collector line that the step voltage produced as a result of one or more inputs to terminals 10, 11 and 12 is produced. Thus, for example, if an input is supplied to terminal 10, assuming that the Adder Control signal is presently allowing addition, transistor 16 will be placed out of conduction and cause the emitter of transistor 32 to rise in potential toward the positive source of D.C. potential connected to resistor 33. This allows transistor 32 to go into conduction and cause a predetermined increment of current to flow through resistor 34. From Fig. 2, it will be seen that the voltage on the common output line at point E is normally at −14.0 volts when there are no inputs supplied to the adder. When one input is supplied, the voltage at point E drops to −9.5 volts. It will be apparent that the reason that the voltage at point E is not equal to the reference voltage of −15 volts during times when no inputs are supplied to the circuit is due to the fact that there is current flowing through the resistances that make up the dividers controlling the base voltages of transistors 41, 42 and 43 in addition to a certain amount of current flowing through the transistors 32, 36 and 39 even during their cutoff condition, this current normally being termed $I_{CO}$.

It will be noticed that the current supplied by a particular transistor going into conduction is approximately four milliamperes. If an input signal is supplied to terminal 11 representing a binary "1," it will be in the form of a positive pulse which will place transistor 26 out of conduction and allow transistor 36 to go into conduction, thereby causing approximately 4 milliamps current to be generated by virtue of its conduction. Thus if both transistors 32 and 36 are conducting, approximately eight milliamperes current will be flowing through the resistor 34 to thereby cause a greater change in voltage at point E, the voltage at this point being thus increased to approximately −5 volts. If now the input to terminal 12 has a binary value of "1," the transistor 30 will be placed out of conduction and transistor 39 will begin conduction, thereby supplying an additional four milliamperes current through the resistor 34 or a total of twelve milliamperes current. This causes the voltage at point E to increase to approximately −0.5 volt.

The use of transistors 32, 36 and 39 in the form in which they are used in the circuit adds greatly to the production of equal increment steps in the step voltage output from point E. This is basically due to the fact that the transistors are relatively constant current devices as used in this configuration.

Having arrived at a step voltage at point E whose amplitude is a function of the number of inputs supplied to terminals 10, 11 and 12, it is now necessary to determine whether Sum and/or Carry outputs are to be produced.

Transistors 41, 42, 43 and 44 are connected in a manner to produce the proper Sum and Carry output signals under the control of the step voltage appearing at point E. Each of the transistors 41, 42 and 43 will be successively biased for conduction as the voltage at point E goes respectively from −9.5 volts to −5 volts to −0.5 volt.

The voltage appearing at point E is connected by way of an RC network, comprising resistor 45 and capacitor 46, to the cathode of a diode 47, the plate of said diode being connected to the base of an NPN junction type transistor 41. The base of this transistor is connected by way of a resistor 48 to a positive source of D.C. potential. The voltage appearing at point E is connected by way of an RC network, comprising resistor 50 and capacitor 51, to the base of an NPN junction type transistor 42. The base of this transistor is connected by way of a resistor 53 to a positive source of D.C. potential and by way of diode 52 to a negative source of D.C. potential. Diode 52 serves to clamp the base so that it cannot go above −5 v. D.C. Resistors 50 and 53 serve as a voltage divider for setting the voltage level of the base.

Transistor 42 has its emitter connected to a negative source of D.C. potential and its collector connected through a resistor 54 to a positive source of D.C. potential. The voltage appearing at point E is connected by way of an RC network comprising resistor 60 and capacitor 61 to the base of transistor 43, said base also being connected by way of resistor 62 to a negative source of D.C. potential. Resistors 60 and 62 form a voltage divider for setting the voltage level at the base. Transistor 44 is controlled by the output of transistor 42. That is, the collector of transistor 42 is connected by way of a parallel RC network comprising resistor 56 and capacitor 57 to the base of transistor 44. As illustrated, the base is also connected through a resistor 58 to a negative source of D.C. potential which is somewhat lower than that to which the resistor 59, which is also connected to the base, is connected. The operation is such that as long as transistor 42 is not in a conductive state, the collector thereof will be sufficiently positive in potential to bias transistor 44 for conduction. However, it will be noted that transistor 44 has its collector connected to the emitter of transistor 41. Therefore, unless transistor 41 is biased for conduction, transistor 44 cannot conduct. When the first step of the step voltage appearing at point E is produced, transistor 41 is biased for conduction and is allowed to conduct since transistor 44 is also biased for conduction. The current path for transistors 41 and 44 is from the positive source of D.C. potential through the resistor 49, transistors 41 and 44 to the negative source of D.C. potential connected to the emitter of transistor 44. This causes the collector of transistor 41 to drop in potential. This signal is connected through a complementary inverter driver which will now be described in detail.

The complementary inverter driver comprises a PNP junction type transistor 64 and an NPN junction type transistor 65, the collectors of these transistors being commoned and connected to an output terminal 72, from which the Sum signal S is supplied. Transistor 64 has its emitter connected to ground while transistor 65 has its emitter connected to a negative source of D.C. potential. The signal taken from the collector of transistor 41 is clamped by means of a diode 63 which prevents the voltage at the collector from going above ground. This means that the collector voltage will drop from ground to approximately −5 v. D.C. when transistor 41 goes into conduction, i.e., to indicate a Sum signal. This collector voltage is connected to the midpoint of a voltage divider comprising, the resistors 68, 66, 69 and 71, the upper end of resistor 68 being connected to a positive source of D.C. potential and the lower end of resistor 71 being connected to a negative source of D.C. potential. High frequency bypass capacitors 67 and 70 are arranged in parallel with resistors 66 and 69, respectively. The base of transistor 64 is connected to a point intermediate resistors 68 and 66, while the base of transistor 65 is connected to a point intermediate resistors 69 and 71.

The operation of the driver circuit just described is such that if the transistor 41 is not conducting, its collector will be at a relatively positive potential. This potential is connected directly to a point intermediate resistors 66 and 69. Since this point will be relatively positive, the base of transistor 64 will be sufficiently positive to prevent conduction thereof. On the other hand, since the base of transistor 65 is connected between resistors 69 and 71, it will receive a relatively positive potential, thereby allowing this transistor to conduct. When transistor 41 goes into conduction, a relatively negative potential appears at the collector thereof and causes the potential at the base of transistor 64 to drop sufficiently to allow this transistor to conduct. Now the base of transistor 65 will be sufficiently negative in potential to cause the transistor to turn off. The effect of the driver is to invert the voltage appearing at the collector of transistor 41 and to increase the power thereof.

To this point, the action in the circuit has been described where only one input signal is supplied to terminals 10, 11 and 12. When the voltage at point E rises to −5 volts due to two inputs being supplied to the adder, transistor 42 will also be biased for conduction, i.e., both of the transistors 41 and 42 will be biased for conduction. Transistor 42 is allowed to conduct causing the potential at the collector thereof to drop sufficiently to turn transistor 44 off. It will be seen that when transistor 44 is turned off, transistor 41 no longer has a low impedance current path from its emitter to a negative source of D.C. potential. Therefore, transistor 41 is disabled and its collector will rise back toward the positive source of D.C. potential connected to the upper end of resistor 49. This means that the output signal at terminal 72 will drop indicating the lack of a Sum signal or a binary "0." On the other hand, since transistor 42 is conducting, the potential at its collector will be sufficiently negative to cause a relatively positive output signal representing a binary "1" to be produced from the Carry output terminal 73. Since the complementary inverter driver for the Carry terminal 73 is identical to that for the Sum terminal 72, no explanation will be made regarding the details of this circuit.

When three input signals are supplied to the adder, the voltage at point E will rise to −0.5 volt and will now in addition bias transistor 43 for conduction. This causes the potential at the collector of transistor 43 to drop and produce a positive going voltage at terminal 72, thereby representing a binary "1" Sum signal. Since transistor 42 is already conducting, it too will produce a binary "1" output signal at terminal 73 representing a Carry. As in the case mentioned above, the fact that transistors 41 and 44 are disabled when more than one input is supplied does not effect the production of Sum and Carry output signals at terminals 72 and 73, respectively.

Reference is made to Fig. 3 which shows the Sum and Carry output signals which are produced from a sample step voltage waveform. As long as the step voltage is at −14 volts, indicating no inputs to the adder, both the Sum and Carry signals will be at −5 volts. As soon as a single input occurs, i.e., either an Addend, Augend or Previous-Carry, the step voltage at point E rises to −9.5 volts and a Sum output is indicated by the rise from −5 volts to ground at terminal 72. The step voltage at point E rises to −5 volts when two inputs are received by the adder causing the Sum output line to drop back to −5 volts and the Carry output to rise to ground thereby indicating a Carry output. Should three inputs be supplied to the adder, the step voltage rises to −0.5 volt and both the Sum and Carry output signals at terminals 72 and 73 will be at ground.

The adder of the present invention is capable of reliable operation at two megacycles, the delay from input to output being only in the order of 0.15 microseconds. Replacement of transistors can be carried out without materially affecting the operation of the circuit. A large number of devices may be driven by the output drivers, there being less than one milliampere D.C. current loading on any driver. Another advantage of this circuit is the fact that it is capable of reliable operation with five volt signals, i.e., signals having a five volt swing. The allowable power dissipation on currently obtainable transistors is fifty milliwatts. With the present invention, the maximum dissipation under even the worst conditions is kept to twenty-five milliwatts or less.

It will be appreciated that the present invention is fully capable of use in either serial or parallel addition operations. As is known by those persons skilled in the art, in serial addition each input is presented one digit at a time from the lowest order digit to the highest order digit. The Carry output is fed back through a one-bit or one-digit delay to serve as the Previous-Carry input to the adder. Where the circuit is used in parallel addition, a separate full adder is used for each digit position of the numbers to be added. The Carry from one order is used as the Previous-Carry for the next higher order digit.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Signal translating apparatus comprising first, second and third current generating means, each of said generating means producing a substantially constant current in response to a predetermined input signal thereto, summing means connected to each of said current generating means for producing a voltage whose amplitude is a function of a number of said generating means receiving input signals, first, second and third transistors connected to receive said voltage, means biasing said first, second and third transistors such that they are respectively caused to produce output signals in response to first, second and third amplitudes of said voltage, and means connected to said second transistor and responsive to the output signal therefrom for disabling said first transistor.

2. Signal translating apparatus comprising voltage generating means for producing a voltage having a first, a second or a third amplitude, said first and second amplitudes and said second and third amplitudes being substantially equal increments of voltage apart, first, second and third transistors, each of said transistors having a conducting and a non-conducting state and including input circuit means coupling it with said voltage generating means, each input circuit means biasing the transistor associated therewith in a manner such that it is responsive to a different amplitude of said voltage for changing it from one state to the other, first and second output terminals, said first transistor producing an output signal at said first terminal when it changes from one of its states to the other, said second transistor producing an output signal at said second terminal following a change from one of its states to the other, and means connected to said second transistor and said first transistor and responsive to the output signal from the second transistor for inhibiting said first transistor, said third transistor producing an output signal at said first terminal following a change from one of its states to the other.

3. Signal translating apparatus comprising first, second and third transistors each having emitter, base and collector electrodes, means connecting the base electrode of each transistor to a fixed potential, an input circuit connected to the emitter electrode of each transistor, each input circuit being responsive to an input signal to cause the transistor associated therewith to change its conductive state, the collectors of said transistors being commoned and connected by means of an impedance to a source of potential, the voltage at said commoned collectors having at least first, second and third amplitudes as a function of the number of said transistors which are conducting, fourth, fifth and sixth transistors, each having a conducting and a nonconducting state and each including input circuit means coupled with the commoned collectors of said first, second and third transistors, each input circuit means biasing the transistor associated therewith in a manner such that it is responsive to a different amplitude of said voltage for changing it from one state to the other, first and second output terminals, said fourth transistor producing an output signal at said first terminal when it changes from one of its states to the other, said fifth transistor producing an output signal at said second terminal following a change from one of its states to the other, and means connected to said fifth transistor and said fourth transistor and responsive to the output signal from said fifth transistor for inhibiting said fourth transistor, said sixth transistor producing an output signal at said first terminal following a change from one of its states to the other.

References Cited in the file of this patent

UNITED STATES PATENTS

| | | |
|---|---|---|
| 2,628,310 | Wood | Feb. 10, 1953 |
| 2,670,445 | Felker | Feb. 23, 1954 |
| 2,689,683 | Gloess et al. | Sept. 21, 1954 |
| 2,772,370 | Bruce et al. | Nov. 27, 1956 |

OTHER REFERENCES

Williams et al.: A Method Of Designing Transistor Trigger Circuits, Proc. of Inst. of Elec. Eng., vol. 100, Part 3, January 1953, pages 228 to 248.

Chaplin: The Transistor Regenerative Amplifier as a Computer Element, Proc. of Inst. of Elec. Eng., vol. 101, Part 3, No. 73, September 1954, page 306.